United States Patent Office 3,457,419
Patented July 22, 1969

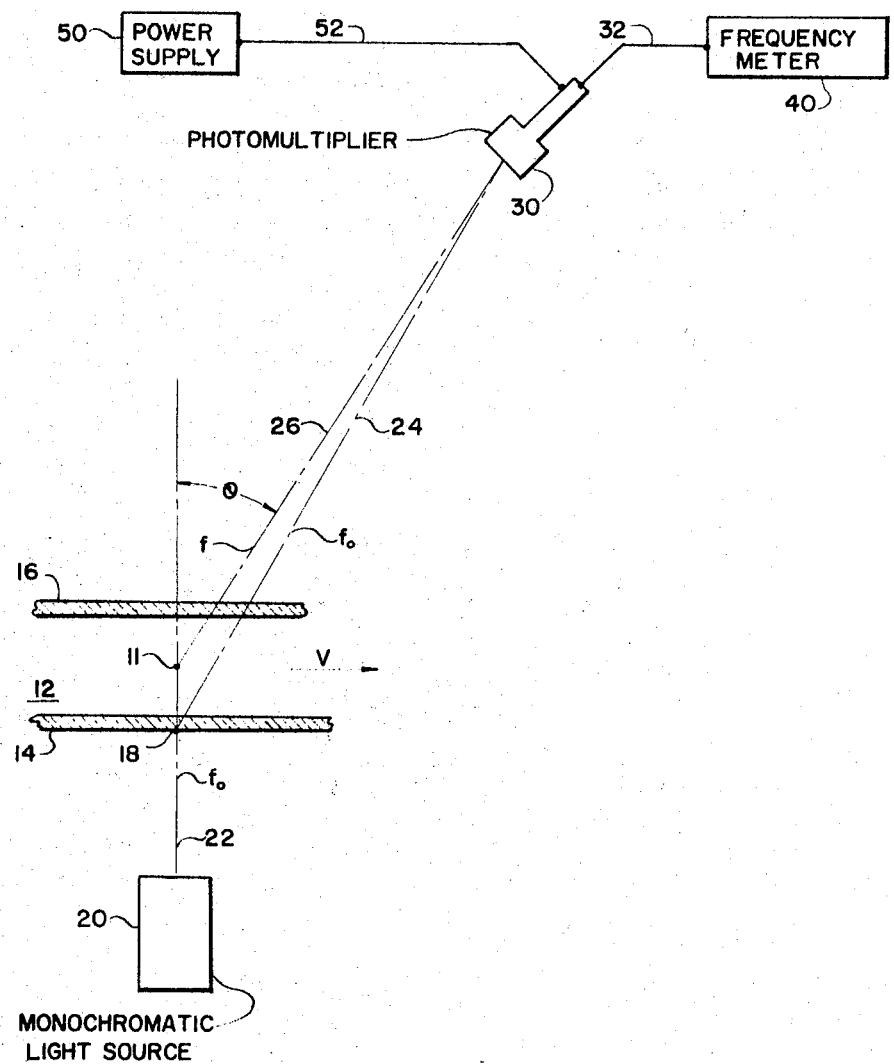

3,457,419
FLUID FLOW METER IN WHICH LASER LIGHT SCATTERED BY THE FLUID AND BY A STATIONARY SCATTERING CENTER IS HETERODYNED
Eugene J. Rosa, Berkeley, Calif., assignor to Shell Oil Company, New York, N.Y., a corporation of Delaware
Filed Aug. 4, 1967, Ser. No. 658,406
Int. Cl. H01j 39/12
U.S. Cl. 250—217                                   5 Claims

ABSTRACT OF THE DISCLOSURE

An apparatus having a laser beam directed onto a translucent chamber through which a fluid flows. Light scattered from the fluid and from a scratch on the chamber are optically heterodyned, detected at a photomultiplier, and the frequency of the resulting signal measured and displayed. This display is directly related to the fluid velocity.

Background of the invention

This invention relates to an apparatus for measuring the velocity of a fluid. More particularly, it relates to an improved apparatus employing the Doppler shift of monochromatic light for measuring the velocity of a fluid.

Knowledge of the velocity of fluid flow through pipes and tubes is, of course, very useful and has many industrial applications. Consequently, instruments to measure the velocity of fluid flow have been in existence for some time. But these instruments have usually resorted to the insertion of a sensor or transducer element within the field of the fluid flow itself. This generates perturbations in the natural flow of the fluid which may introduce measurement errors or interfere with the process itself.

Recently, however, the availability of a highly monochromatic light source has made possible the optical measurement of fluid flow velocity. This has been achieved by observing the Doppler shift in the frequency of monochromatic light scattered from particles or inhomogeneities in the moving fluid. It is well known that in light, as in other wave phenomena, a change of wave length occurs when the wave source is in motion. The waves propagated in the direction of motion are shortened, while the waves propagated in the opposite direction are lengthened; since there is no change in the velocity of the waves as they propagate through a medium of fixed retractive index, a stationary observer receives a frequency which is larger or smaller than that of the source.

The basic equation for electromagnetic wave motion is $$c = f\lambda$$

where $\lambda$ is the wavelength, $f$ is the frequency of wave motion, and $c$ is the velocity of light.

If a light source were moving directly toward a fixed observer with a velocity V, then the observer would receive $V/\lambda$ waves per unit time in addition to the number $f°_0 = C/\lambda$ that would reach him if the source were at rest. The apparent frequency would then be $$f = f_0 + \frac{V}{\lambda} \sin \theta$$

where $\theta$ is the angle between a line from the source to the observer and a line normal to the path of the source.

Recently a system for utilizing this principle in the measurement of fluid flow velocities was assembled by Foreman et al., Laser Doppler Velocimeter for Measurement of Localized Flow Velocities in Liquids, Proceeding of the I.E.E.E. March 1966; Measurement of Localized Flow Velocities in Gases With a Laser Doppler Flowmeter, Applied Physics Letters Volume 7, No. 4 (1965); and independently by Yea et al., Localized Fluid Flow Measurements With a He-Ne Spectrometer, Applied Physics Letters, Volume 4, No. 10 (1964). In all cases the systems relied on heterodyning an original beam of monochromatic light with light scattered from a moving particle or inhomogeneity in the fluid. However, in all cases substantial amounts of optics such as mirrors, beam splitters, lenses, etc., were found necessary to carry out the measurements.

The addition of optics to a system is expensive and often inconvenient; but even more importantly, the optical systems of the prior art required a very delicate alignment. Misalignment of fractions of a degree could cause a malfunction of the instruments. Consequently, the instruments of the prior art were not useful for many industrial applications where vibration and other disturbances could upset the delicate optical alignment.

Summary of the invention

It is therefore an object of this invention to provide a new and more useful apparatus using monochromatic light for measuring the velocity of a fluid.

It is a further object of this invention to provide an apparatus for measuring the velocity of fluid flow with fewer optical components.

Finally, it is an object of this invention to provide an instrument for measuring the velocity of fluid flow that is rugged and durable and may be used in a variety of industrial applications.

These and other objects of the present invention are realized by an apparatus that consists of a housing forming a flow conduit having a translucent portion forming at least a part of the wall thereof and with a light-scattering center as part of the translucent portion of the housing. A laser source capable of generating a beam of monochromatic light is positioned outside the housing and in such a manner that the laser beam is directed through the translucent wall thereof with a portion of the beam directed onto the scattering center. A photodetector, having a photosensitive input means to receive light from the laser source and an electrical output means, is positioned at some angle other than 0° and 180° to the axis of the beam of monochromatic light. And a frequency measuring device is electrically coupled to the output of the photodetector.

Brief description of the drawing

All of the objects of the invention, as well as the details of an illustrative embodiment, will be more fully understood from the following description of the accompanying drawing, in which FIGURE 1 is a schematic diagram of the apparatus.

Description of preferred embodiment

Referring to FIGURE 1 of the drawing, liquid is passed through a flow conduit 12 delineated by a housing with walls 14 and 16. The flow conduit may be of any cross-shown. The housing may be of any material so long as a part of it is at least translucent to the wave length of the light provided by the monochromatic light source. The section should be such that it allows a beam of light to enter the flow conduit and light scattered at some angle other than 0° or 180° from the beam to exit the conduit. However, making the entire circumference of the housing of translucent material over a few inches of its length is preferable. It is also understood that translucent includes transparent, and in practice a transparent material would be used.

A light-scattering site 18 is provided on the wall of the housing. A light-scattering site may be any discontinuity in the translucent material of the housing wall such as a scratch or a bead.

A source of monochromatic light 20 capable of producing a beam 22 of monochromatic light with frequency $f_0$ is positioned such that the beam falls upon the light-scattering center as it passes through the walls of the housing. As a monochromatic light source, typically a laser such as model 125 manufactured by Spectra-Physics, Mountain View, Calif., would be used.

Light beam 24 is a part of light beam 22 from light source 20 that is scattered at light-scattering center 18 at an angle such that it is detected by photodetector 30. Another light beam 26 is part of light beam 22 that is scattered from a discontinuity 11 in the fluid flowing in conduit 12 at an angle $\theta$ from beam 22 and is mixed with beam 24 at photodetector 30. Because scattering center 11 is moving with the fluid at a velocity V, light scattered therefrom will appear to have a new frequency $f$, displaced from the frequency $f_0$, of the source 20 by an amount in accordance with the theory described above.

Photodetector 30 may be any device, that is capable of translating a light signal into an electrical signal; but a preferred device would be a photomultiplier model 7102 produced by RCA Corporation, New York, N.Y., with a relatively high gain. The output of photomultiplier 30 is taken through lead 32 to the input of frequency meter 40. Frequency meter 40 may be any device capable of measuring the frequency of the input signal as for example, an oscilloscope or a spectrum analyzer. For example, Spectrum Analyzer Model SDA-3a of Singer-Metrics Division, Bridgeport, Conn. may be used. With a photomultiplier, a power supply is necessary. Therefore, one embodiment includes a power supply 50 connected through lead 52 to the photomultiplier. A model HU-1544 Power Supply manufactured by Power Designs, Palo Alto, Calif. may be used.

Operation of the invention

To measure the velocity of fluid flowing through flow conduit 12, a beam of monochromatic light 22 is directed at conduit 12 such that one part of beam 22 is scattered at light-scattering center 18 and another part is scattered at light-scattering center 11 in the fluid. Light-scattering centers in the fluid may consist of bubbles, impurity particles, and the like. Nearly all fluids have sufficient light-scattering centers to be effectively measured, but in cases where there is no detectable light scattering, impurities such as colloidal silica or smoke could be added for this purpose.

Scattered light beam 24 at frequency $f_0$ from light-scattering center 18 and scattered light beam 26 at frequency $f$ from scattered center 11 interact with each other to produce beat frequencies that are the sum and the difference of $f$ and $f_0$. For a detailed discussion of this phenomenon known as optical heterodyning, see Forrester et al., Photoelectric Mixing of Incoherent Light, Physical Review, 99, No. 6 (1955), or Laseovka et al., Light-Beating Techniques for the Study of the Rayleight-Brillouin Spectrum; or Hanlon et al., Narrow Band Optical Heterodyning, Applied Optics, 6, No. 31967.

In this case the difference frequency is detected in the photomultiplier 30 and transmitted by lead 32 to the Y input of the spectrum analyzer, where it can be read off directly. Then since the beat frequency=$f-f_0$, the value of $f$ may be found. Knowing $f$, $f_0$, the angle $\theta$, and the wave length one can solve for V in the following equation, reprinted from above $$f = f_0 - \frac{V \sin \theta}{\lambda}$$

Among the many possible applications, the above described invention has been found particularly useful in measuring the flow velocity in very small tubes. For example, it has been successfully applied to the measurement of flow velocity in a capillary with a diameter of twenty thousands of an inch.

I claim:
1. An apparatus for continuously measuring the velocity of a fluid comprising:
   a housing forming a flow conduit having a section thereof formed of translucent material with a light scattering center thereon;
   a laser source capable of generating a beam of monochromatic light, said laser source being positioned outside said housing and in such a manner that the laser beam is directed through the translucent wall thereof with a portion of said beam directed onto said scattering center;
   a photodetector, said photodetector having a photosensitive input means to receive light from said laser source and an electrical output means, said photodetector further being positioned at some angle other than 0° and 180° to the axis of said beam;
   a frequency measuring device, said frequency measuring device being electrically coupled to the output of said photodetector.
2. The apparatus of claim 1 wherein said photodetector receives only scattered monochromatic light.
3. The apparatus of claim 1 wherein said photodetector is at an angle greater than about 3° from the axis of said beam.
4. The apparatus of claim 1 with the addition of a power supply, said power supply being electrically coupled to said photodetector.
5. The apparatus of claim 4 wherein said photodetector is a photomultiplier.

References Cited

UNITED STATES PATENTS 3,320,804    5/1967    Halberstam _____ 250—218 X

RALPH G. NILSON, Primary Examiner

T. N. GRIGSBY, Assistant Examiner

U.S. Cl. X.R.

73—194; 250—207, 218, 223; 356—28